United States Patent Office 3,558,508
Patented Jan. 26, 1971

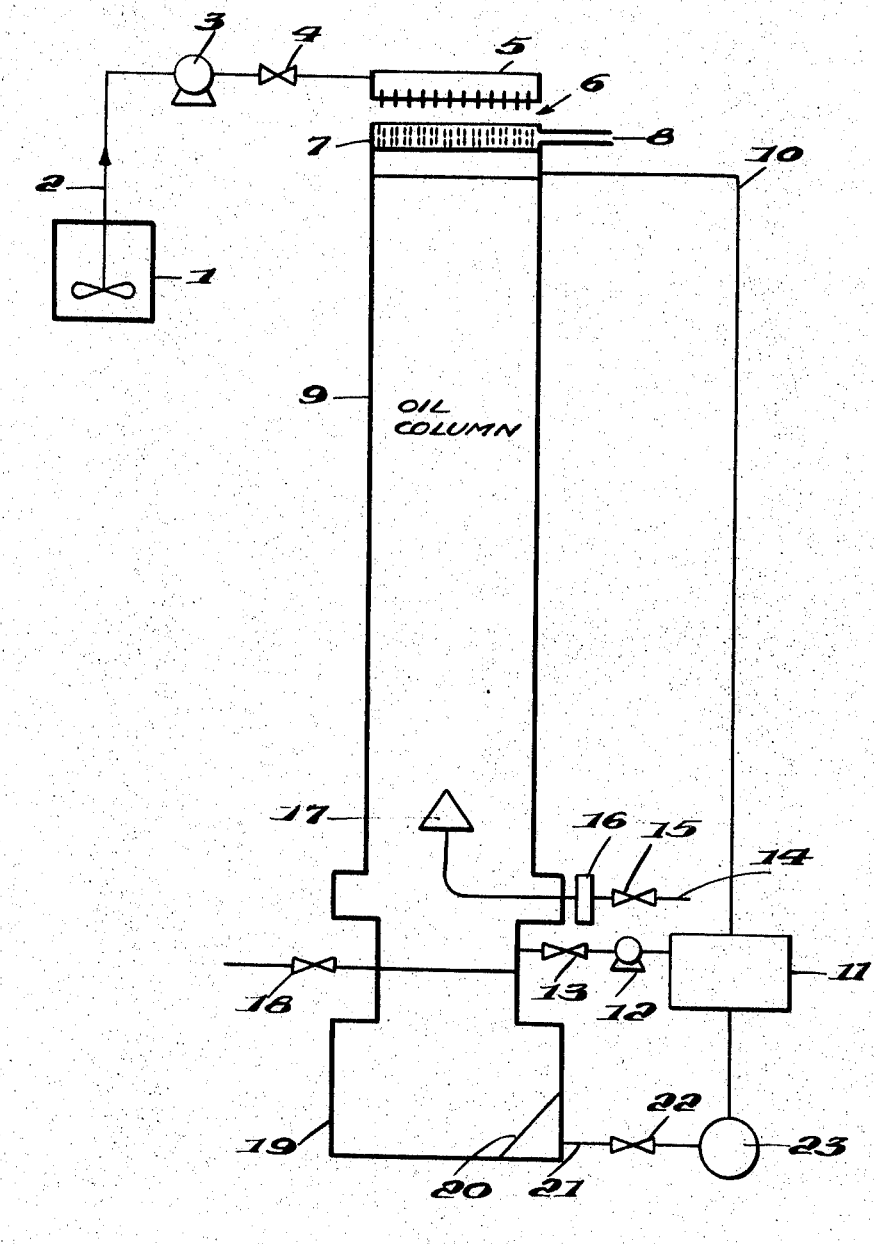

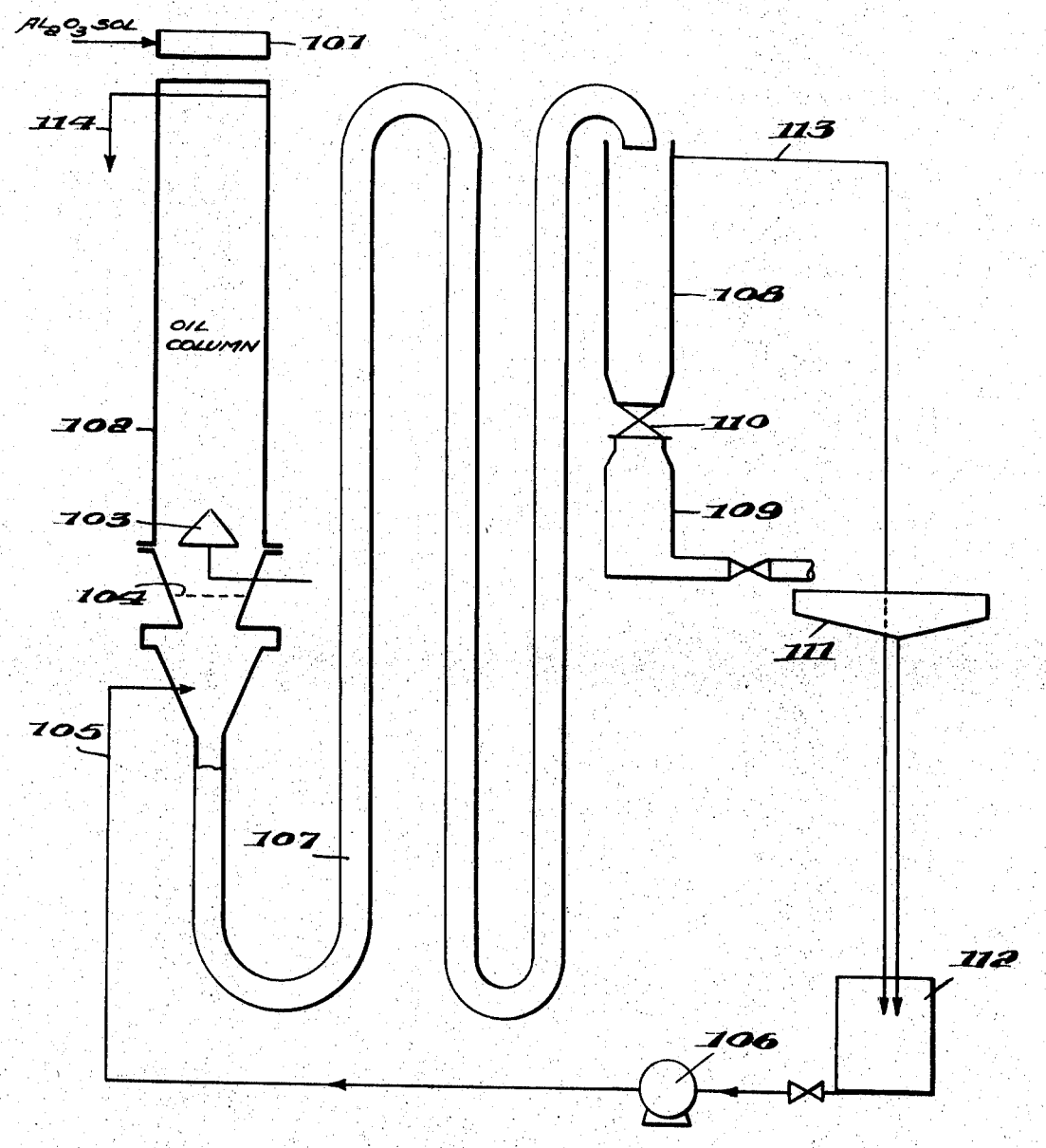

3,558,508
PREPARATION OF SPHEROIDAL ALUMINUM OXIDE GELS
Carl D. Keith, Summit, and Kurt W. Cornely, Westfield, N.J., assignors to Engelhard Industries, Inc.
Continuation of application Ser. No. 513,393, Dec. 13, 1965. This application Feb. 4, 1969, Ser. No. 805,086
Int. Cl. B01j 13/00, 11/06, 11/44
U.S. Cl. 252—317
28 Claims

ABSTRACT OF THE DISCLOSURE

Spherical aluminum oxide gels are made by feeding drops of a coagulable aqueous slurry of hydrous alumina into a column of a water-immiscible liquid, e.g., mineral oil, which can be maintained at close to ambient temperature. The hydrous alumina is prepared by hydrolysis of finely divided aluminum having a surface area of about 75,000 to 1,000,000 square millimeters per gram, and the hydrolysis medium is acidic from the presence of a non-oxidizing acid for instance, formic acid. The hydrous alumina feed has a ratio of alumina monohydrate to amorphous hydrous alumina of at least 0.5/1 and the alumina monohydrate has a crystallite size of less than 65 A. Ammonia can be added to the column to aid the coagulation. Other solids, for instance, calcined alumina, alumina trihydrate, silica or carbon can be incorporated in the aqueous slurry as can aluminum oxychloride. Drying and calcination of the coagulated hydrous alumina provides adsorptive solids with advantageous characteristics when used, for instance, as catalyst components.

This application is a continuation of application Ser. No. 513,393, filed Dec. 13, 1965, now abandoned.

This invention relates to a method for the manufacture of aluminum oxide gels of substantially spherical shape. More particularly, it concerns an improved oil-drop method for producing spheroidal aluminum oxide-containing gels which are useful as precursors for adsorbents, catalyst carriers and other solid, treating or contacting agents.

Various processes for the preparation of spheroidal inorganic gels such as alumina gels, silica gels, and other refractory inorganic oxides and mixtures thereof, have heretofore been proposed. There are definite advantages to be achieved in producing gels of spheroidal shape. When used as a fixed bed in a reaction or contacting zone, the spheroidal shaped particles permit more uniform packing and thereby reduce variation of pressure drop through the bed and accordingly, reduce channeling which otherwise results in a portion of the bed being bypassed. Another advantage in using particles of this shape is that the spheroids contain no sharp edges which will break or wear during processing or handling and therefore, the tendency to plug the process equipment is reduced. These advantages are magnified when the alumina particles are used as a moving bed, that is, when the particles are transported from one zone to another by either the reactants or by an extraneous carrying medium. It is thus seen that the use of particles of this shape permits a more effective utilization of the particular oxide material.

One of the most described methods for producing spheroidal refractory inorganic gels is the oil-drop method and comprises dispersing drops of an inorganic aqueous slurry into a water-immiscible suspending medium, see for instance U.S. Pats. Nos. 2,422,499 and 2,435,379, wherein the drops set into hydrogel spheroids.

Although from certain early prior disclosures one might conclude that the formation of firm alumina spheres by the oil-drop procedure is relatively simple, practical success in this regard is rare and the problems involved in such operations are noted in the more recent U.S. Pats. Nos. 2,620,314 and 2,689,226. The patentees became considerably involved when trying to overcome these difficulties and they recognized that selection of the starting alumina is an important aspect of the process. The patentees thus devised a procedure utilizing the product resulting from the heating and digesting of aluminum chloride and aluminum metal. The oil-drop column employed was of necessity at a temperature of at least 120° F., preferably of about 190–205° F. In spite of this special system the patentees produced a water-soluble sphere that had to be aged in a basic medium before being contacted with water. The process is further dependent on the mixing of the alumina sol made from aluminum metal and aluminum chloride, with a defined weak base such as hexamethylenetetramine, and relatively inexpensive coagulating materials, such as ammonium hydroxide could not be employed. The disadvantages of this type of operation are apparent.

Thus, when one studies U.S. Pats. Nos. 2,620,314 and 2,689,226 he realizes the difficulty in making firm alumina spheres by relatively simple procedures, and this problem is particularly troublesome when a low temperature oil drop column is utilized. The patents also point to the effect the characteristics of the initial alumina sol has on the success of the method and on the properties of the spherical product. From consideration of these disclosures and the following description of the present invention, it will be appreciated that we have provided a relatively simple method for producing alumina hydrogel spheres which is dependent upon proper selection of the starting alumina fed to the water-immiscible coagulating column. This procedure even permits the use of a low temperature column and the relatively inexpensive ammonia as a coagulating agent in the column.

The method of the present invention depends upon particular selection of the alumina charged to the coagulating medium disposed in a dropping column to produce desirable alumina hydrogel spheres which are essentially insoluble in water and can be used as precursors for catalyst bases, adsorbents and other solid contact agents. Thus, the features of the present invention cooperate to give an improved method for manufacturing spheroidal aluminum oxide gels from an aluminum oxide slurry which can be low in or even devoid of aluminum salt content and the coagulated hydrogel has, unlike the products of U.S. Pats. Nos. 2,620,314 and 2,689,226, little, if any, water solubility even without aging in a basic or heated medium subsequent to gelation. In our process firm, discrete, spheroidal aluminum oxide gels can be produced which do not adhere to one another or at least can be separated without undue deformation and which can be easily handled in further processing without the danger of breakage or loss of their spheroidal shape. The spheroidal particles are considered firm when they can retain their spherical form under the weight of other spheres at least two feet deep. Our improved process also enables us to operate our column at ambient temperature using, if desired, the relatively inexpensive ammonia as a coagulating agent. Moreover, in our method we can incorporate one or more of a variety of solid fillers in the base alumina thereby improving the porosity and other characteristics of the final product.

As noted, the present invention is based to considerable extent on the finding of a hydrous alumina which makes our operation feasible and gives a product of desired characteristics. The coagulable hydrous alumina we employ is a hydrogel in which relatively small crystallite size alumina monohydrate is a significant component, with amorphous hydrous alumina constituting the essential balance of the hydrous alumina. The hydrous alumina may contain minor amounts of other materials, e.g., alumina trihydrate; and as noted herein, one or more of a variety of solid fillers can be present in the slurry charged to the coagulation column. The alumina monohydrate to amorphous alumina weight ratio is at least 0.5:1, preferably at least 0.75:1, expressed as Al₂O₃ equivalent. If excessive amount of amorphous hydrous alumina are present, the alumina will not form firm spheres in contact with a gelling agent. The monohydrate has a crystallite size of less than 65 A. and preferably less than 40 A. Typically, the monohydrate size is about 15 to 30 A. The hydrous alumina phases and size of the monohydrate are as determined by X-ray diffraction analysis of dried samples according to known techniques.

In a highly preferred method for preparing the spheroidal aluminum oxide gels of the instant invention, an aqueous slurry of hydrous alumina prepared by the method of U.S. Patent application Ser. No. 416,891, filed Dec. 8, 1964 and now U.S. Patent No. 3,429,660, is dispersed as drops into a column of water-immiscible liquid containing a coagulating agent which is preferably gaseous ammonia passing upwardly through the column. As the drops descend in the column essentially firm spheroidal particles are formed. The resulting particles may be collected in the lower portion of the column and they represent the solid contacting agent precursor of this invention. The collected particles can be separated from the water-immiscible or other liquid and, if desired, aged in ammonia water, washed, dried and calcined. If the solid precursor is calcined, the resulting product is a hard, porous spheroidal alumina gel which is useful as an adsorbent, a treating, refining or purifying agent, and particularly as a catalyst carrier in hydrocarbon conversion processes.

The nature of the alumina employed is important to the success of our method and as noted is preferably prepared by the interaction of water with very finely divided aluminum metal in the presence of an acid. In this process, aluminum, in a state of extremely fine subdivision and high surface area, is contacted with water, preferably at a temperature near the boiling point of water, in the presence of a non-oxidizing acid. The reaction produces a fine particle hydrous alumina slurry in water, the hydrous alumina being either one or preferably both of the valuable boehmite and amorphous forms.

In this process the aluminum employed is finer than most materials referred to as "powder" and the metal used has a surface area of about 75 thousand to 1 million square millimeters per gram, preferably about 150,000 to 600,000 mm.²/gm. The aluminum may often be in the general particle size range of about 2 to 100 microns. Preferably at least about 50 percent of the particles are about 10 to 40 microns. The aluminum is usually one where at least about 90 percent can pass a 325 mesh sieve (U.S. Standard Sieve Series).

An aluminum suitable for this process may have a purity greater than about 99% or even greater than 99.9% and may be obtained by atomizing molten aluminum in air. Such purity is especially desirable where the alumina is to be used as a support for a noble metal such as platinum. The aluminum often will have a particle size range primarily in the 5 to 50 micron range, for instance as follows:

| Particle size, microns | Proportion of particles, percent |
|---|---|
| 3.5–10 | 5–7 |
| 10–20 | 15–26 |
| 20–30 | 16–29 |
| 30–40 | 26–31 |
| 40–44 | 3–25 |
| 44–70 | 4–13 |

If the aluminum contains more than about 15% of particles in the range of 44–70µ, or an appreciable amount of particles above 70µ, the reaction may require a longer time to go to completion or may never go to completion, under the preferred conditions of acid concentration. Too fine a particle size may lead to temperature control problems in the conversion procedure.

In this process, an acid is supplied to the reaction between aluminum and water but the amount of acid is insufficient to supply one acid ion for each two atoms of aluminum, that is to say, the ratio of aluminum atoms to acid anions is greater than 2:1 and may be up to about 30:1 or more. Preferably, the ratio of aluminum atoms to acid anions is about 5–15:1 or even as much as about 25:1. Usually the reaction will be conducted at a pH below about 4.1.

In order to avoid the presence of ions which would require extensive washing of the product to yield an acceptable catalyst material, the acid employed may be one which will vaporize or be oxidized during the drying or other processing step of the alumina manufacture or decompose to materials vaporizable under these conditions. Nitric or other oxidizing acids give a number of poor results, in part due to interaction with the hydrogen produced in the reaction. Therefore, water-soluble, organic carboxylic acids generally are preferred for the reaction, in particular, the soluble saturated lower fatty acids, say of 1–2 carbon atoms, e.g., formic acid, acetic acid, trichloroacetic acid, etc. The monobasic acids are advantageous and formic acid is the most preferred.

The concentration of acid in the reaction mixture at any point of the reaction may have an effect on the product distribution. The preferred alumina monohydrate-hydrous amorphous alumina mixture can be produced when the formic acid is very dilute, that is, sufficient to keep the pH of the reaction within the range of about 3 to 4. Above this pH, the product may tend to gel before the reaction is complete, thus delaying or preventing completion. Also, the formic acid may tend to decompose excessively. It is often preferable, therefore, to use formic acid of a molarity of about 0.6–0.7 and also to add the formic acid incrementally during the course of the reaction so that the pH will stay within the desired range.

Water in the liquid phase is present in the reaction mixture in amounts sufficient to keep the mixture fluid. Generally, the ratio of water to aluminum will be at least about 9 moles of water per gram atom of aluminum, preferably about 20–30:1. Higher amounts of water, that is, greater than about 30 moles per gram atom of aluminum, say up to about 60–75 moles, do not seem to offer any advantages to off-set the need for a larger reactor volume and a need to filter the resulting alumina product to get a practical slurry concentration. Where aluminum is added incrementally to the reaction mixture, it is possible and sometimes feasible to use slightly less than 10 moles of water per gram atom of aluminum.

The total reaction mixture usually contains a ratio of about one mole acid to about 2–30 gram atoms of aluminum metal to at least about 18, e.g., about 18 to 2,250 moles of water. Preferably about 100–750 moles of water and 5–15 gram atoms of aluminum are often used per mole of acid.

As mentioned, it may often be preferred to add the aluminum metal and/or the formic acid incrementally to the water during the course of the reaction. Such incremental additions of formic acid and aluminum metal should preferably be at such rates that the approximate 1:5–15:100–750 acid-aluminum-water ratio described above and the 3 to 4 pH are maintained essentially throughout the reaction. Such manipulations accelerate the rate of reaction and provide for improved concentration of Al₂O₃ in the product slurry. For ease of handling, the fine aluminum powder may often be transported to the reaction zone as a slurry in water.

Reaction conditions for producing the alumina generally include a temperature of at least about 60° C., although the reaction may be slow below the preferred range of about 90–110° C. The reaction can readily take place at a higher temperature, e.g., up to about 500 pounds steam pressure, that is, about 250° C., but pressurized equipment is required at this temperature to keep the necessary liquid phase. At the preferred temperature or below, one atmosphere pressure is satisfactory and water may be refluxed during the reaction. Often the reaction produces a relatively highly concentrated alumina slurry which can be sent directly to our coagulation procedure. Sometimes, however, it may be desirable to further concentrate the slurry and in such cases additional acid may be used after the reaction to peptize the alumina particles. Subsequent evaporation can then be employed to obtain a pourable thick slurry containing up to about 60% or more hydrous alumina.

This process is advantageous in its speed and in the fact that the completeness of the reaction (usually essentially 100%) and its freedom from reliance on non-vaporizable reagents give a purer product for uses such as in catalysts where purity is often essential. This process can provide the alumina as a much more concentrated water slurry than other processes; the slurry may contain about 3–15% alumina, often about 7–12%, but by the proper choice of reaction procedures, can give a slurry containing as high as about 11 to 12% or more alumina. Under a preferred set of conditions, the alumina obtained from the slurry will consist essentially of hydrous alumina in the amorphous and boehmite forms and in the proportions of about one part amorphous to 1–4 parts boehmite, which is advantageous in many catalyst situations. The boehmite, is generally of the small crystallite type, say of about 15–35 A.

To more particularly define the manner of coagulating the alumina, reference is made to the drawings wherein:

FIG. 1 shows a first embodiment of the process of the present invention; and

FIG. 2 shows a second embodiment thereof.

One embodiment of a suitable flow system of the present invention is shown schematically in FIG. 1. Thus, a hydrous alumina slurry, for instance, made according to the method of the aforementioned U.S. Patent application Ser. No. 416,891, now U.S. Patent No. 3,429,660, can be passed from slurry reservoir 1 through pipe 2, slurry pump 3 and valve 4 to the multiple orifice feed distributor head 5 located at the top of oil column 9 and containing a multiplicity of hypodermic syringe discharge needles 6 which extend through column head 7 The column head contains ammonia takeoff line 8 which is used to bleed excess ammonia from the system. The syringe needles employed can vary in size so as to give spheroidal particles of desired diameter, for instance, from about 0.007 inch to about 0.25 inch on the basis of a calcined product, preferably about 0.04–0.20 inch. The slurry is then dispersed as drops from the syringe nedle tips and the drops fall into a column of water immiscible liquid. The water-immiscible liquid is treated with ammonia which is introduced at the bottom portion of column 9 through feed line 14, valve 15, flow meter 16, and a porous sparger 17. When the drops of slurry initially contact the immiscible liquid they are usually lens-shaped. However, as the drops of alumina slurry descend through the column of ammonia-treated immiscible fluid they gradually age to produce spheroidal slurry particles of desired firmness. The spheroidal particles pass from the oil column to the collection vessel 19. When desired, the valve 18 can be closed and the collection vessel contain the spheroidal particles removed and replaced with a new oil-filled vessel. The valve is then opened and the process continued. The oil can be drained from the collection vessel containing the spheroidal particles through sieve 20, removed through line 21 by the operation of valve 22, passed through centrifuge 23 and recycled to oil sump 11. Oil overflow line 10 permits oil to be returned to the sump for subsequent charging to the column via pump 12 and valve 13.

The time required for the drops to fall through the column should be sufficient to form firm spheroidal particles and can be adjusted by varying the length of the column and the viscosity of immiscible liquid. A normal falling rate is from about 15–75 seconds, preferably from about 30–60 seconds. Regardless of whether or not the slurry drops contain a filler, we prefer that the slurry contain about 6 to 20% solids.

The spheroidal particles at the lower end of the coagulation column can be aged to a firmer state. Aging in oil is not necessary to give spheres which are essentially water-insoluble. If the spheres are aged in oil, water or other medium, for instance, to develop additional hardness, then the aging time need not exceed about one hour. It is generally acceptable to age the particles from about 2 to 60 minutes, preferably up to about 30 minutes, in aqueous ammonia, e.g., having a concentration of about 3 to 15 percent; however, if they are aged too long in aqueous ammonia they may tend to become friable. In the process of the present invention we may not age, especially when a halogenated aliphatic hydrocarbon such as $CCl_4$ is used to decrease falling rate of spheres and increase solubility of ammonia in the oil.

To make a hard, adsorptive and porous particle the spheroidal particles are dried, often after water or aqueous ammonia washing, to remove free water, and such drying can include calcining which removes water of hydration. However, in the case where the spheroidal particles are used to make active catalyst carriers, e.g., a gamma family aluminum oxide, conditions of calcination are not so severe as to give catalytically inactive materials such as $\alpha$-alumina. The spheroidal particles can be dried, for instance, at a temperature of about 200–400° F., and suitable calcination temperatures include about 500–1300° F., preferably about 800–1200° F. The spheroidal particles after washing and drying and/or calcination are ready for further processing, such as impregnation with precious metal catalysts, base metal catalysts, metal/metal oxide catalysts, etc.

The gelation of the spheroidal particles can be brought about in part by the presence of a coagulating agent in the water-immiscible liquid. Although ammonia is preferred, other coagulating agents can be used. Among the useful materials are the weak bases which are water-soluble and have a strong buffering action at a pH from about 4 to 10, preferably about 5 to 9, e.g., hexamethylene tetramine. Various nitrogen-containing bases can be used, e.g., urea, tetramethyl ammonium hydroxide, etc., some of which may release ammonia in the water-immiscible liquid. The coagulating agent can be mixed with the alumina before the latter is formed into drops providing the alumina is not unduly gelled which may particularly be a problem if too much gelling agent is added or if the mixed material is allowed to sit for too long a time before being released from the drop-forming mechanism.

We greatly prefer, however, that the coagulating agent be mixed with the water-immiscible liquid into which the drops are passed. This is most conveniently done by passing the agent into the liquid column, e.g., into its bottom portion, and ammonia is particularly suited for this type of operation. Ammonia is further preferred since it is relatively inexpensive and provides spheres of good quality and thus we strongly prefer that the water-immiscible column be essentially free of other nitrogen-containing materials, and there be a slight excess of ammonia as evidenced by the bubbling of ammonia from the top of the column. Although excess ammonia can be withdrawn from the system, e.g., via ammonia take-off line 8, the rate of ammonia or other coagulating agent introduced into the water-immiscible liquid column should be sufficient to produce firm particles but should not be so high that the ammonia concentration at the air-immiscible liquid interface gives instantaneous gelation of the drops of slurry issuing from the orifices, which may result in plugging of the orifices as well as give mis-shapen particles with undesirable physical characteristics. Also, as the immiscible liquid becomes saturated with water from the feed slurry, the immiscible liquid also becomes saturated with ammonia, due to the high solubility of ammonia in water. The effect of this over-saturation can be that the drops of slurry which can be lens-shaped at the moment of contact with the immiscible liquid surface remain so due to the high ammonia concentration. To avoid this difficulty water can be separated from the immiscible liquid by centrifuging or drying by contact with an adsorbent, during passage through line 21 to sump 11.

It was noticed that a high discharge rates from the hypodermic syringe needles (orifices) the hydrous alumina slurry drops may have a tendency to cluster at the top of the column prior to their fall as spheroidal particles through the oil column. This problem, if observed, can be overcome by the incorporation of a small amount of soluble starch into the slurry, for instance up to about 10% but preferably about 1–3% based on the weight of alumina. Violent agitataion in the slurry reservoir may give rise to an excessive amount of air entrainment in the slurry due to the frothing of the starch/slurry mixtures and therefore should be avoided.

The water-immiscible coagulation medium used in the process of the instant invention can be, for example, any of the mineral oils which produce a firm spheroidal gel for a given length of oil column. Examples of suitable mineral oils include kerosene, heavy naphtha, light gas oil, lubricating oil, coal tar oils such as xylol, etc. A desirable water-immiscible medium is a lubricating oil with a viscosity of about 55–75 SUS at 100° F. However, if the spheroidal gel contains aluminum oxychloride the use of only mineral oil may cause the spheres to be too soft and consequently they will flatten when collected. The addition of a halogen-containing lower aliphatic solvent or diluent such as carbon tetrachloride, bromo-ethane, acetylene tetrabromide, etc., to the oil can eliminatae this problem by increasing the ammonia solubility in the oil. Other suitable diluents for the water-immiscible liquid in the liquid column include liquids or solids which are denser than the water-immiscible liquid and fully miscible therewith in the proportions used. Such densifiers may, when used, often comprise about 10 to 30 volume percent of the column of liquid. The densified liquid retards settling of the spheroids in the column and may make possible successful use of a shorter column. An additive increasing ammonia solubility in the liquid as noted may be of especial advantage.

A frequently used water-immiscible medium is white mineral oil having a specific gravity of at least about 0.850. The medium utilized is dependent upon the length of the oil column and the specific gravity of the hydrous alumina slurry which is in turn dependent upon the total alumina concentration in the slurry. If the specific gravity of the oil medium is too low, the spheroidal particles will fall through the column at a high rate which may cause incomplete gelation, thus making the handling and processing difficult. If the specific gravity is too high, this may retard completely the descent of the spheroids. The specific gravity of the feed slurry is often in the range of about 1.150–1.170. The length of the oil column can vary widely depending, for instance, on the speed of coagulation. The column will usually be from about 1 to 30 feet in length, more often about 6 to 20 feet.

One of the advantages of the present invention is the elimination of the necessity in the alumina feed of organic nitrogen-containing coagulating agents such as hexamethylenetetramine, urea, morpholine, etc. It was found that when $NH_3$, $NH_3$-forming base, or a strong nitrogen-containing base is mixed with the spheroidal-forming slurry, gelation may tend to occur before the particles are dropped. Thus in the preferred form of the process of the present invention, ammonia is added to the bottom portion of the column thus avoiding immediate gelation problems of the alumina feed and the particles therefore gradually age as they descend in the column.

Another advantage of the instant invention is the elimination of the necessity for heating the immiscible liquid to insure gelation of the alumina-containing slurry. We can operate our immiscible liquid column at substantially ambient temperatures, e.g., up to about 120° F., preferably up to 100 or 110° F., whereas in the prior art processes, it is usually necessary to heat the oil column in order to obtain sufficient spheroid hardness, often followed by aging in both hot oil and hot ammonia. Heating the column, in addition to the obvious expense, may cause loss of coagulation agent, e.g., $NH_3$, and even of densifier material such as $CCl_4$ if such be present.

The hydrous alumina product as prepared above can be the sole component used to form the spheroidal aluminum oxide-containing gels of the present invention. However, in order to obtain spheres of improved porosity, additional pore volume, increased surface area, and reduced bulk density, it may be advantageous to provide a solid filler in the alumina slurry.

Various solids can be used as fillers in the present process by the addition to the alumina slurry prior to dropping. The amount of filler used may vary widely and may be as much as 65% or more of the total solids and for any material effect at least about 1% is generally employed. Advantageously, about 15 to to 65% of inorganic fillers and about 1 to 30% of organic (including carbon) fillers based on total solids can be employed. We prefer, however, that the solids of the slurry be composed to a major extent of alumina. The type of filler can be varied widely providing the acid character of the alumina fed to the column is not destroyed. For instance, the pH will usually not exceed about 5.5 when alumina oxychloride is present and in the absence of such material the pH will generally not be greater than about 4.5. In general the pH will not be lower than 3.3 whether alumina oxychloride or filler is present to prevent excessive peptization of the alumina hydrosol. Fillers having a particle size of about 2–40 microns are particularly desirable since large particles may cause the spheres to lose their shape. Examples of typical fillers include alumina, silica, amorphous silica-alumina, crystalline alumino silicates, carbon, starch, etc., and mixtures thereof. Carbon and organic fillers may be added and then burned out of the spheres during calcination to improve porosity and even afford an increase in large pores. Although up to about 30% or more carbon or other solid fillers based upon the weight of the total solids can be added, it was determined that when small amounts of carbon, in the vicinity of about 1 to 5% are employed along with an alumina filler of the type described below in amounts of about 20 to 65%, preferably about 30 to 55%, based on total solids, the porosity can even be further improved as compared to the use of alumina alone as a filler.

The preferred filler is an alumina material which may comprise up to about 65% or more of the total alumina in the slurry, especially about 20 to 50%. The alumina considered to be a filler is dissimilar to the amorphous hydrous alumina or alumina monohydrate components which are in the essential coagulable slurry. Such a slurry may be produced in one reaction system or additional amounts of the amorphous or small crystalline monohydrate forms added. In the latter case these materials are not considered as fillers. The preferred type of alumina filler added is a trihydrate or a calcined catalytically-active, i.e., gamma family, form of alumina. If an alumina-containing filler is added to the hydrous alumina slurry, the total alumina content of the mixture may often vary from about 12 to 18%. This range of alumina concentrations obviates excessive build-up at the orifice discharge and at the same time maintains a comparatively high rate of discharge from the orifices. Higher concentrations, up to about 27% alumina, have been used. However, at concentrations not far above this amount, the slurry may become a gelled mass which cannot be completely broken down to give a fluid system.

Aside from the addition to the alumina slurry of the solid filler, a material may be incorporated which will also gel in the water-immiscible liquid. In this type of operation the filler is formed more or less in situ, preferably in amounts up to about 20% based on the total solids.

Silica can be incorporated into the hydrous alumina slurry, for instance, by the addition of a colloidal silica solution. When using this source of silica, up to about 10% by weight based on the total weight of ignited solids may often be used. Higher concentration of silica from this source may tend to lead to excessive dilution of the feed slurry and can cause gelation of the hydrous alumina due to the high pH (about 9.6) of the silica solution. Incorporation of silica into the hydrous alumina slurry from sources other than a colloidal silica solution is limited only by the relative increase in viscosity which is encountered as the ratio of filler to slurry is increased. Amounts of silica up to about 60% based on the weight of the total ignited solids has been found to be effective. A silica sol having an average diameter of about 5 to 30 millimicrons has also been found to give the advantages of increased porosity, increased surface area, and increased large pore volume.

An alumina-forming salt, e.g., aluminum oxychloride, in an amount of say up to about 20 weight percent, preferably about 1 to 10%, expressed as $Al_2O_3$ equivalent, may be included in the feed slurry. The alumina resulting from such salt is considered as amorphous when designating the boehmite to amorphous alumina ratio. In any event the presence of the alumina-forming salt has led to increases in total pore volume, large pore volume, i.e., in pores of over 200 A. diameter, and surface area, as well as decreases in bulk density.

The spheroidal product, when containing the filler material, normally has a pore volume of about 0.6 to 1.5/cc. per gram whereas if the filler is omitted, the pore volume will often be in the range of about 0.3 to 0.45 cc. per gram. We prefer that sufficient filler be used to give an increase in the large pore volume, i.e., pores having a size of at least 200 A., of at least about 0.1 cc. per gram based on calcined or activated spheres. The calcined or activated type of filler is preferred since the hydrates such as alumina trihydrates, when used, give rise to more shrinkage during drying and calcination. Moreover, if too much of the hydrates is added, the particles may become very weak and in some instances may shatter. Also, the advantages afforded by the filler can be lessened if a more or less fully dehydrated metal oxide, e.g., alpha alumina, is added.

The spheroidal final product may contain at least 1% water, preferably at least 2% water, when calcined at 550° C. However, to further improve the porosity of the final product, the water in the formed spheroids can be replaced by a water-miscible, lower alcohol such as methanol. This can be accomplished by extracting the spheroids in alcohol for about 2 to 60 hours at room temperature. The alcohol is then removed and the spheroidal particles dried.

The following examples will serve to illustrate the present invention but are not to be considered limiting.

EXAMPLE I

Example I illustrates the preparation of an aqueous slurry of hydrous alumina by the acid hydrolysis method of U.S. Patent application Ser. No. 416,891, now U.S. Patent No. 3,429,660. To a 1-liter, fluted, three-necked pyrex flask fitted with a high-speed two-bladed agitator, a reflux condenser and a thermoregulator was added 500 cc. of deionized water, 1 cc. of 88% formic acid and 6.25 grams of atomized aluminum metal (99.5% purity, surface area of 310,000 mm.²/g.; particle size distribution of 5–50μ). The agitator was set to rotate at 1800 r.p.m. and the reaction was initiated at room temperature. As the temperature rose, the rate of hydrogen production increased. The temperature was allowed to reach 100° C. and maintained at this temperature. At the end of 1.5 hours an additional 6.25 grams of aluminum metal and 10 cc. of 0.684 molar formic acid were added to the reaction mixture. Further equal additions of aluminum metal were made at 3.5, 4.5, 5 and 6 hours total reaction time, so that a total of 25 grams of aluminum metal had been added. During the time interval of 2–6 hours, 0.684 molar formic acid solution was added until a total of 0.095 moles of 100% formic acid had been added. The reaction was allowed to continue for a total of 12 hours at the end of which the reaction mixture was completely free of aluminum.

The pH of the reaction mixture was shown to be 3.4. The pH was adjusted to 8.4 with a 1:10 dilution of ammonium hydroxide in water. The mixture gelatinized as the pH was increased. The gelled product was filtered and dried at 110° C.

X-ray diffraction analysis showed the dried product to consist of 22 amorphous hydrous alumina and 78% boehmite with a crystallite size of 27.8 A. The dried product had a surface area of 255 m.²/g. (BET).

The following examples illustrates the preparation of spheroidal alumina gels of the instant invention using as the starting material a hydrous alumina slurry prepared by the foregoing acid hydrolysis method, or a mixture of said slurry with various fillers and additives as previously discussed.

Unless otherwise indicated the water-immiscible column employed in all of the examples was a mixture of 77% by volume of a mineral oil having a viscosity of 65/75 SUS and 23% by volume of carbon tetrachloride. Also, unless otherwise specified, the $Al_2O_3$ gel spheres were aged for 15 minutes in a 6% solution of aqueous ammonia, washed and dried at 240° F. for about four hours, and calcined at 1020° F. for about four hours. The surface area, large pore volume, bulk density, and mesh size were measured and tabulated in Table I.

EXAMPLE II

An amorphous alumina/boehmite slurry prepared by the acid hydrolysis method of U.S. Patent application Ser. No. 416,891, now U.S. Patent No. 3,429,660, having a composition of 34% amorphous alumina 66% boehmite (18A. boehmite, crystallite size ) was beaten at a low speed in a Waring type blender. The slurry was then fed to an oil column 10 feet in length and 4 inches in diameter via a cylindrical stainless steel head to which were attached 9 18-gauge hypodermic syringe needles. The slurry was supplied to this head by means of a peristaltic type pump so that there would be a constant discharge rate from the syringe needles. The immiscible medium employed was a mixture of 77% by volume of a 65/75 SUS viscosity mineral oil and 23% by volume of carbon tetrachloride. Gaseous ammonia was added to the oil/carbon tetrachloride mixture at the rate of 1–5 ml./min. by means of a porous sparger located in the bottom portion of the column to substantially saturate the mixture. At the upper portion of the column there was attached an exhaust system so that the droplets emanating from the syringe needles would not coagulate immediately upon striking the free, ammonia-containing space above the oil/carbon tetrachloride level. As the droplets contacted the oil/carbon tetrachloride surface they immediately began to gel, and assumed a spheroidal shape which was retained and became more firm as they descended through the immiscible medium in the column. The spheres were collected in a suitable container attached to the bottom of the oil column. They were then drained free of oil, aged for 15 minutes in a 6% aqueous ammonia solution, washed with water, dried at 240° F. for 4 hours, and calcined at 1020° F. for 4 hours. The properties of the spheroidal particles thus obtained are tabulated in Table I.

EXAMPLE III

To an amorphous alumina/boehmite slurry prepared as indicated in Example II, and which contained 60% by weight of the total alumina desired, was added a quantity of calcined alumina (in gamma form) so that this quantity of alumina represented 40% by weight of the total alumina present. This mixture was agitated at high speed in a Waring type blender to obtain the desired fluidity. The amorphous alumina/boehmite solution used had the following X-ray diffraction composition: 19% amorphous alumina/81% boehmite (23 A. crystallite size.) The gamma alumina used had a particle size distribution: 4% (b.w.) 1.8–2.0µ; 16% (b.w.) 2–5µ; 35% (b.w.) 5–10µ; 45% (b.w.) 10–22µ. To this mixture was also added a quantity of water soluble starch representing 1.5% by weight of the total alumina present in the slurry. The spheroidal particles were formed in the manner outlined in Example II, treated in the same manner as in Example II and their properties are tabulated in Table I.

EXAMPLE IV

To a quantity of amorphous alumina/boehmite slurry prepared as indicated in Example II and having the composition 19% amorphous alumina/81% boehmite (23A. crystallite size), and representing 50% by weight of the total alumina desired, was added a quantity of uncalcined hydrous alumina having a composition of 23% amorphous alumina/boehmite, 77% trihydrate alumina, and having the following particle size distribution: 9% (b.w.) 1–5µ; 16% (b.w.) 5–10µ– 54% (b.w.) 10–20µ; 21% (b.w.) 20–34µ. To this mixture was added a quantity of water-soluble starch representing 1.5% by weight, based on total alumina present. The mixture was agitated at high speed in a Waring type blender and the resulting mixture was fed to the orifice head and processed as indicated in Example II. The spheroidal particles thus formed were treated in the same manner as specified in Example II. Their properties are tabulated in Table I.

EXAMPLE V

To a quantity of amorphous alumina/boehmite slurry prepared as indicated in Example II, having the composition 19% amorphous alumina/81% boehmite (23 A. crystallite size), and which contains 60% by weight of the total alumina desired, was added a quantity of dried, calcined, alumina (gamma form), representing 40% of the total alumina desired. The calcined alumina had the following particle size distribution by weight: 4% 1.8–2.0µ; 16% 2–5µ; 35% 5–10µ; 45% 10–22µ. To this mixture was added a quantity of water-soluble starch representing 1.5% by weight of total alumina present and a quantity of Norit S.G. carbon powder representing 2.0% by weight of the total alumina present, and having less than 0.5% retained on a 200 mesh sieve. The mixture was agitated in a Waring type blender and fed to the orifice head and processed as indicated in Example II. The spheres thus formed were treated as specified in Example II, giving a spheroidal product having the properties as tabulated in Table I.

EXAMPLE VI

To a quantity of amorphous alumina/boehmite slurry prepared as indicated in Example II and having the composition of 34% amorphous alumina/66% boehmite (18 A. crystallite size), was added a quantity of water-soluble starch representing 10.0% by weight of the total alumina. This mixture was agitated in a Waring type blender until the desired consistency was obtained, fed to the orifice head, and processed as outlined in Example II. The spheres thus formed were treated in the same manner as outlined in Example II, giving a final spheroidal product having properties as tabulated in Table I.

EXAMPLE VII

To a quantity of amorphous alumina/boehmite slurry prepared as indicated in Example II, and having the composition 33% amorphous alumina/67% boehmite (18 A. crystallite size) and representing 51.7% of the total solids desired was added a quantity of calcined alumina (gamma form) having the following particle size distribution: 16% 1.8–2.0µ; 35% 2–5µ; 33% 5–10µ; 16% 10–22µ; and representing 39.7% by weight of the total solids. In addition, there was added a quantity of Du Pont Ludox LS-30 colloidal silica, containing 30% by weight silica and representing 8.6% by weight of the total solids. This mixture was agitated in a Waring type blender until the desired consistency was obtained and the spheroidal product was formed as specified in Example II. The spheres thus formed were treated as indicated in Example II giving a spheroidal product having properties as tabulated in Table I.

EXAMPLE VIII

To a quantity of amorphous alumina/boehmite slurry prepared as indicated in Example II, having the composition 34% amorphous alumina/66% boehmite (18 A. boehmite, crystallite size), and representing 50% by weight of the total calcined solids desired, was added a quantity of calcined dried alumina (gamma form) having a particle size distribution as follows: 4% 1.8–2.0µ; 16% 2–5µ; 35% 5–10µ; 45% 10–22µ. This calcined alumina represented 45% of the total calcined solids desired. In addition, a quantity of aluminum oxychloride sol (21.93% alumina, 7.73% chloride) representing on an alumina basis, 5% of total calcined alumina desired, was added to the slurry. The mixture was then added to a quantity of water-soluble starch representing 1.5% by weight of the total alumina present. The mixture was agitated in a Waring type blender until the desired consistency was obtained and the spheroidal product was formed as outlined in Example II. The spheres thus formed were further treated as indicated in Example II, giving a spheroidal product with the properties as tabulated in Table I.

EXAMPLE IX

To a quantity of amorphous alumina/boehmite slurry prepared as indicated in Example II, and having the composition of 28% amorphous alumina/72% boehmite (21% A. crystallite size) representing 60% of total calcined solids desired, was added a quantity of calcined alumina (gamma form) having a particle size distribution: 10% 1.8–2.0µ; 50% 2–5µ; 31% 5–10µ; 9% 10–14µ; and representing 40% by weight of the total calcined solids desired. A quantity of water-soluble starch was added to the mixture, representing 1.5% by weight based on the total alumina present, and the mixture was agitated in a Waring type blender until the desired consistency was obtained. The spheroidal particles were formed as indicated in Example II, drained of oil, soaked for 10 minutes in 6% aqueous ammonia, washed free of ammonia and then extracted for sixty hours in methanol at room temperature. At the end of this time the methanol was removed and the spheroidal particles dried at 240° F. for two hours, and calcined at 1020° F. for two hours. The properties of the final product are tabulated in Table I.

EXAMPLE X

To a quantity of amorphous alumina/boehmite slurry prepared as indicated in Example II, having a composition of 19% amorphous alumina/81% boehmite (23 A. crystallite size), and representing 46% by weight of the total ignited solids, was added a quantity of fluid catalytic cracker powder, 100% 200 mesh, at 86.97% ignited solids, representing 50% by weight of total ignited solids, and having a composition of 87% silica, 13% alumina. This mixture was agitated in a Waring type blender at low speed to the desired fluidity. To this mixture was then added a quantity of 48% HF, dropwise, so that the total amount of F ion represents 4% of total ignited weight solids. The mixture thus obtained had a calculated composition as follows: 52.5% $Al_2O_3$, 43.5% $SiO_2$, and 4% F. Addition of the 48% HF caused an immediate gelation, which was obviated by dilution of the slurry to a final ignited weight basis solids of 10%. The spheroidal particles were formed as indicated in Example II. The spheroidal particles were then aged in 20% aqueous ammonia for a period of 15 minutes, washed with water and further aged for a period of 16 hours in 6% aqueous ammonia at room temperature to a pH of 7, followed by washing the spheres with water, drying at 240° F. for three hours and finally calcining at 1020° F. for 16 hours. The properties of the final product are tabulated in Table I.

EXAMPLE XI

To an amorphous alumina/boehmite slurry prepared as indicated in Example II, having the composition of 48% amorphous alumina/52% boehmite (21 A. boehmite, crystallite) a solids content of 9.73 alumina, and representing 60% by weight of the total calcined solids was added a quantity of calcined alumina (gamma form) representing 40% by weight of the total solids content, having a particle size distribution as indicated in Example III. To this mixture was added carbon powder (where less than 0.5% by weight is retained on 200 mesh), representing 2% by weight based on the total calcined solids present. In addition there was added to the above mixture a quantity of water-soluble starch representing 1.5% by weight based on total calcined solids present. The mixture was agitated in a Waring type blender until the desired degree of consistency and homogeneity was obtained, and the spheroidal particles were formed as outlined in Example II, with the single exception that the immiscible medium consisted solely of a white mineral oil of 65/75 SUS viscosity. The spheroidal particles formed in this manner were similar to those formed in Example II, and were treated according to the procedure of Example II. The properties of the spheroidal particles had an apparent bulk density of 0.59 g./cc., with an 8–14 mesh size.

EXAMPLE XII

To a quantity of amorphous alumina/boehmite slurry prepared as indicated in Example II, having a composition of 48% amorphous alumina/52% boehmite (21 A. crystallite size), with a solids content of 9.73% $Al_2O_3$, and representing 50% by weight of total calcined solids desired was added calcined alumina (gamma form) representing 50% by weight of the total calcined solids present and having the particle size distribution of: 50.5% 1–5μ; 38.5% 5–10μ; 11.0% 10–20μ– (8% 10–14μ and 3% 14–20μ). In addition, a quantity of carbon powder (<0.5% retained on 200 mesh sieve), and representing 2% by weight of total calcined solids was added to the mixture.

The mixture was then agitated to the desired consistency and homogenity in a Waring type blender, and the spherical type particles were formed as outlined in Example II, with the sole exception that the immiscible medium consisted solely of a 65/75 SUS viscosity white mineral oil. The formed spheres were post-treated as indicated in Example II. The properties of the final spheroidal particle are tabulated in Table I.

EXAMPLE XIII

To a quantity of amorphous alumina/boehmite slurry prepared as in Example II, having a composition of 48% amorphous alumina/52% boehmite (21 A. crystallite size), and representing 60% by weight of total ignited weight solids, was added an amount of calcined (gamma modification) alumina, having the following particle size distribution: 4% 1.8–2.0μ; 16% 2.0–5.0μ 35% 5–10μ; 45% 10–22μ; and representing 40% by weight of total ignited weight solids. In addition, there was added an amount of carbon (100%—200 mesh), representing 2% by weight of ignited weight solids. The mixture was beaten in a Waring type blender until the desired degree of homogenity was attained. The spheres were formed as indicated in Example II, with the exception that the immiscible medium consisted solely of a 65/75 SUS viscosity mineral oil. After formation, the spheres were drained free of oil, washed with water until essentially free of surface adhering oil, and dried at 120° C. for a period of 14 hours. The dried spheres were then calcined at 550° C. for a period of 4 hours by charging the spheres to a furnace at 350° C. raising furnace temperature to 550° C. over a period of 45 minutes and holding spheres at 550° C. for a period of 4 hours. The properties of the calcined spheres are tabulated in Table I.

EXAMPLE XIV

Example XIV demonstrates the use of the spheroidal particles of the instant invention as catalyst carriers for hydrotreating type catalysts.

To an amorphous alumina/boehmite slurry prepared as indicated in Example II, having the composition of 19% amorphous alumina, 81% boehmite (23 A. crystallite size), and representing 60% by weight of the total alumina present was added 40% by weight milled alumina which had been calcined at 550° C. The calcined alumina has a particle size distribution of: 16% 1–2μ; 35% 2–5μ; 33% 5–10μ; 9% 1–14μ; and 7% 14–23μ. To this mixture was added 2% by weight of carbon, and 1.5% by weight of a water-soluble starch, based on the weight of alumina present in the slurry. The final slurry was utilized to make spheroidal particles similarly as in Example II. The spheroidal product thus formed was drained free of oil, aged 15 minutes in 6% aqueous ammonia, washed to a pH of 7.0, dried at 240° F. for 12 hours (2.4% free water), and finally calcined at 550° C. in a dry air stream for 4.5 hours. The properties of the spheroidal product are tabulated in Table I.

The spheroidal particles were then vaccum impregnated with aqueous solutions of nickel and molybdenum salts, i.e., $Ni(NO_3)_2 \cdot 6H_2O$ and $(NH_4)_6Mo_7O_{24} \cdot 4H_2O$ to give a final catalyst containing 4% nickel and 16% molybdenum oxide. The impregnated spheroids were dried for 6 hours at 120° C., calcined for 1 hour from an initial temperature of 450° C. to a final temperature of 540° C. and held at 540° C. for an additional 2 hours. The finished catalyst possessed an apparent bulk density of 0.756 gm./cc., a surface area of 252 m.$^2$/gm. a porosity of 0.56 cc./gm. and a large pore volume of 0.09 cc./gm.

EXAMPLE XV

In order to illustrate another form of the present invention, we have included FIG. 2 which shows a schematic flow diagram of a preferred embodiment. In this operation an amorphous alumina/boehmite slurry prepared by the acid hydrolysis of aluminum metal as described above, having a composition of 47% amorphous alumina/53% boehmite (20 A. boehmite crystallite size), and representing 55% by weight of the total alumina desired was intimately mixed with a quantity of calcined alumina (gamma form) which represented 45% by weight of the total alumina present. The gamma alumina used had a particle size distribution: 18% (b.w.) 1–5μ; 43% (b.w.) 5–10μ; 28% (b.w.) 10–15μ; 11% (b.w.) 15–23μ. To this slurry was added 2% by weight of carbon powder (100% through 270 mesh, 53 micron openings) based on the total calcined products present. The total amount of solids, exclusive of the carbon, in the slurry was 18.6%. The slurry was then further mixed and spheres were formed by pumping the resulting slurry by means of a gear pump to a multiple-orifice head 101. The thusly formed spheres were passed through a column of mineral oil 102 which had been saturated with gaseous ammonia by means of sparger 103. The ammonia was added at the rate of 500–700 cc. of $NH_3$/min. The column of oil was 12 ft. high and 18 in. in diameter and had a viscosity of 65/75 SUS at 100° F. As the droplets contacted the oil surface they immediately began to gel, and assumed a spheroidal shape which was retained and became more firm as they descended through the oil in the column. The travel time for the spheres through the oil column was about 40 seconds. The spheroidal particles passed through the oil/NH₃ interface 104 and were transported by means of liquid flow induced at point 105 by pump 106 throughout the piping indicated by 107. The transport liquid from pump 106 was 6% aqueous ammonia which is heavier than the oil phase and also serves as an aging medium. The time of transport from interface 104 to hold tank 108 varied from 30 seconds to 1.5 minutes, often being about 35 seconds. The thusly formed spheres were held in tank 108 for from 2 to 6 minutes and discharged to container 109 by opening valve 110 after which tank 108 was again isolated by closing valve 110. The spheres were then discharged from tank 109 to a suitable drainage system 111 from which the aqueous ammonia was drained to tank 112 which served as a reservoir for pump 106. Pipes 113 and 114 were utilized to handle any ammonia and oil overflow, respectively. The drained spheres were then washed, dried at 240° F. for 16 hours and calcined at 1022° F. for 4 hours to give spheroidal particles with the physical characteristics shown in Table I.

drops through a column of water-immiscible liquid coagulation medium, the solids of said slurry consisting essentially of hydrous alumina in which the ratio of alumina monohydrate to amorphous hydrous alumina is at least 0.5/1 and said monohydrate has a crystallite size less than 65 A., feeding drops of said slurry in fluid form into a column of water-immiscible liquid coagulation medium, passing said drops of slurry downwardly through said water-immiscible liquid to form firm, discrete spheroidal particles while said drops pass through said water-immiscible liquid coagulation medium.

2. The process of claim 1 in which the ratio of alumina monohydrate to amorphous hydrous alumina is 1 to 4: about 1 and the crystallite size of the alumina monohydrate is less than 40 A.

3. The process of claim 2 in which the finely divided aluminum is in the size range of about 5 to 50 microns.

4. The process of claim 2 in which the acid hydrolysis reaction takes place at a temperature of about 90 to 100° C., and at about 1 atmosphere of pressure.

TABLE I

| Example | Composition of slurry feed | Immiscible medium | Crush strength (lbs.) | Surface area, m.²/g. | Total pore volume, cc./g. | Large pore volume, cc./g. | Apparent bulk density, g./cc. | Mesh size |
|---|---|---|---|---|---|---|---|---|
| II | 100% amorphous/boehmite | 77% mineral oil + 23% CCL₄ | 16.5 | 314 | 0.43 | 0.01 | 0.72 | −12+14 |
| III | 60% amorphous/boehmite / 40% calcined alumina (gamma form) / 1.5% starch (based on weight of alumina) | Mineral oil+CCL₄ | 13.0 | 313 | 0.63 | 0.07 | 0.65 | −12+14 |
| IV | 50% amorphous/boehmite / 50% uncalcined hydrous alumina / 1.5% starch | do | 12.1 | 313 | 0.63 | 0.21 | 0.65 | −8+14 |
| V | 60% amorphous/boehmite / 40% calcined alumina / 1.5% starch (based on weight of alumina) / 2.0% carbon (based on total weight of solids) | do | 14.2 | 235 | 0.72 | 0.24 | 0.57 | −8+14 |
| VI | 100% amorphous/boehmite / 10% starch | do | 15.8 | 308 | 0.58 | 0.09 | 0.63 | −8+14 |
| VII | 51.7% amorphous/boehmite / 39.7% calcined alumina (gamma form) / 8.6% colloidal silica (30% by weight silica) | do | 13.6 | 282 | 0.76 | 0.35 | 0.60 | −8+14 |
| VIII | 50% amorphous/boehmite / 45% calcined alumina (gamma form) / 5% aluminum oxychloride / 1.5% starch | do | 11.6 | 229 | 0.90 | 0.42 | 0.49 | −8+14 |
| IX | 60% amorphous/boehmite / 40% calcined alumina (gamma form) / 1.5% starch | do | 8.4 | 228 | 1.0 | 0.51 | 0.42 | −8+14 |
| X | 46% amorphous/boehmite / 50% calcined solids / 4.0% fluoride | do | 7.9 | | | | 0.378 | |
| XI | 60% amorphous/boehmite / 40% calcined alumina (gamma form) / 2% carbon / 1.5% starch | Mineral oil only | 12.7 | | | | 0.59 | −8+14 |
| XII | 50% amorphous/boehmite / 50% calcined alumina (gamma form) / 2% carbon | do | 13.9 | 256 | 0.82 | 0.38 | 0.52 | −6+10 |
| XIII | 60% amorphous/boehmite / 40% calcined gamma Al₂O₃ / 2% carbon | do | 12.7 | 265 | 0.76 | 0.22 | 0.556 | −8+14 |
| XIV | 60% amorphous/boehmite / 40% calcined alumina / 2% Carbon / 1.5% starch | Mineral oil+CCL₄ | | 288 | 0.73 | 0.08 | 0.60 | |
| XV | 55% amorphous/boehmite / 45% calcined alumina (gamma form) / 2% carbon | Mineral oil only | | 260 | 0.93 | 0.42 | 0.51 | −8+14 |

It is claimed:

1. A process for preparing spheroidal aluminum oxide gels which consists essentially of reacting finely-divided aluminum having a surface area of about 75,000 to 1 million square millimeters per gram with liquid water in the presence of a water soluble, lower fatty acid in the ratio of about 1 mole of acid/2–30 gram-atoms of aluminum/at least about 18 moles of water, at a temperature of about 60 to 250° C., and a pressure sufficient to maintain the liquid phase, to form as an acid hydrolysis product a hydrous alumina slurry essentially free of unreacted aluminum, said slurry having an acid pH sufficient to cause formation of firm, discrete, spheroidal particles from said hydrolysis product during subsequent passage as 5. The process of claim 2 in which the acid is formic acid.

6. The process of claim 5 in which the ratio of acid hydrolysis reactants is about 1 mole formic acid/5–15 gram atoms of aluminum/100–750 moles of water.

7. The process of claim 6 in which the finely divided aluminum is in the size range of about 5 to 50 microns and the reaction takes place at a temperature of about 90 to 100° C., and at about 1 atmosphere pressure.

8. The process of claim 1 wherein the water immiscible liquid is a mineral oil of sufficient viscosity to produce spheroidal aluminum oxide particles.

9. The process of claim 8 in which ammonia is passed into the lower portion of the column to aid said coagulation.

10. The process of claim 9 wherein the discrete, spheroidal particles are drained of immiscible liquid, dried and calcined to form a porous adsorptive catalytically-active aluminum oxide gel.

11. The process of claim 8 wherein to the hydrous alumina slurry is added about 1 to 65% of a solid filler based on total solids in the slurry, said resulting slurry having an acid pH sufficient to form said discrete, spheroidal particles.

12. The process of claim 11 wherein the solid filler is an alumina selected from the group consisting of alumina trihydrate and activated alumina in an amount of about 20 to 65% of the total alumina in the slurry.

13. The process of claim 2 wherein to the hydrous alumina slurry is added about 1 to 65% of a solid filler based on total solids in the slurry, said resulting slurry having an acid pH sufficient to form said discrete, spheroidal particles.

14. The process of claim 13 wherein the solid filler is an alumina selected from the group consisting of alumina trihydrate and activated alumina in an amount of about 20 to 65% of the total alumina in the slurry.

15. A process for preparing spheroidal aluminum oxide gels which consists essentially of reacting at a temperature of about 90 to 100° C., a mixture consisting essentially of water, finely-divided aluminum having a surface area of about 150,000 to 600,000 square millimeters per gram and formic acid sufficient to impart a pH of about 3 to 4, holding the reaction mixture at a temperature of about the boiling point of water, incrementally adding the finely divided aluminum and formic acid to maintain said pH and temperature and continuing said holding until a mixture of hydrous alumina and water is obtained having a concentration of about 7 to 12% alumina, to form an acid hydrolysis product consisting essentially of hydrous alumina in which the ratio of alumina monohydrate to amorphous hydrous alumina is at least 0.5/1 and said monohydrate has a crystallite size less than 65 A., said hydrolysis product being essentially free of unreacted aluminum and having an acid pH sufficient to cause formation of firm, discrete spheroidal particles from said hydrolysis product during subsequent passage as drops through a column of water-immiscible coagulation medium, feeding drops of said acid hydrolysis product in fluid form into the upper portion of a column of water-immiscible liquid coagulation medium maintained at a temperature of up to about 110° F., wherein said water immiscible liquid is a mineral oil of sufficient viscosity to form spheroidal particles, adding ammonia as a coagulating agent to a lower portion of said column of liquid, passing said drops of acid hydrolysis product downwardly through the ammonia-containing immiscible liquid until they coagulate to form in said immiscible liquid firm, discrete spheroidal particles.

16. The process of claim 15 in which the ratio of alumina monohydrate to amorphous hydrous alumina is 1 to 4 about 1 and the crystallite size of the alumina monohydrate is less than 40 A.

17. The process of claim 16 wherein to the acid hydrolysis product is added about 1 to 65% of a solid filler based on the total solids in the slurry.

18. The process of claim 17 wherein the solid filler is selected from the group consisting of alumina-containing materials, silica-containing materials, carbon, starch and mixtures thereof.

19. The process of claim 18 wherein the discrete spheroidal particles are drained of immiscible liquid, dried and calcined to form a porous adsorptive catalytically-active aluminum oxide gel.

20. The process of claim 17 wherein the solid filler is an alumina selected from the group consisting of alumina trihydrate and activated alumina in an amount of about 20 to 65% of the total alumina in the slurry.

21. The process of claim 20 wherein to the solid alumina filler is added about 1 to 5% carbon based on the total solids in the slurry.

22. The process of claim 17 wherein the pH of the slurry after addition of the filler is between about 3.3 and 4.5.

23. The process of claim 1 wherein to the acid hydrolysis product is added about 1% to 20% of aluminum oxychloride expressed as $Al_2O_3$ equivalent and based on the total alumina content of the slurry, the pH of the slurry after such addition being between about 3.3 and 5.5.

24. The process of claim 1 wherein to the acid hydrolysis product is added about 1–20% aluminum oxychloride expressed as $Al_2O_3$ equivalent, together with about 1–65% of an activated alumina, both based on the total alumina content of the slurry.

25. A process for preparing spheroidal aluminum oxide gels which consist essentially of reacting finely divided aluminum having a surface area of about 75,000 to 1,000,000 square millimeters per gram with liquid water in the presence of a water-soluble, non-oxidizing acid in the ratio of aluminum atoms to acid anions greater than 2 to 1 to form as an acid hydrolysis product a hydrous alumina slurry, the solids of said slurry consisting essentially of hydrous alumina in which the ratio of alumina monohydrate to amorphous hydrous alumina is at least 0.5/1 and said monohydrate has a crystallite size less than 65 A., said slurry being essentially free of unreacted aluminum and having an acid pH sufficient to cause formation of firm, discrete spheroidal particles from said hydrolysis product during subsequent passage as drops through a column of water-immiscible coagulation medium, feeding drops of said slurry in fluid form into a column of water-immiscible liquid coagulation medium, passing said drops of slurry downwardly through said water-immiscible liquid to form firm, discrete spheroidal particles while said drops pass through said liquid coagulation medium.

26. The process of claim 25 in which the column of water-immiscible liquid is at a temperature of form ambient up to about 110° F.

27. The process of claim 26 in which the ratio of alumina monohydrate to amorphous hydrous alumina is 1 to 4: about 1 and the crystallite size of the alumina monohydrate is less than 40 A.

28. The process of claim 26 in which ammonia is passed into the lower portion of the column to aid coagulation.

References Cited
UNITED STATES PATENTS

| | | |
|---|---|---|
| 2,371,237 | 3/1945 | Heard et al. |
| 2,435,379 | 2/1948 | Archibald. |
| 2,663,620 | 12/1953 | Haensel. |
| 2,900,349 | 8/1959 | Schwartz. |

RICHARD D. LOVERING, Primary Examiner

U.S. Cl. X.R.

252—448, 453, 463, 465

UNITED STATES PATENT OFFICE
CERTIFICATE OF CORRECTION

Patent No. 3,558,508           Dated January 26, 1971

Inventor(s) Carl D. Keith and Kurt W. Cornely

It is certified that error appears in the above-identified patent and that said Letters Patent are hereby corrected as shown below:

Column 3, line 32, after "a" --catalyst or-- was omitted.

Column 7, line 8, "a" should be --at--.

Column 8, line 22, the word "to" was printed twice.

Column 9, line 65, "pyrez" should be --pyrex--.

Column 11, line 26, after "5-10µ", the "-" should be --;--.

Column 17, line 59, in claim 16, after "4" the --:-- was omitted.

Column 18, line 48, "form" should be --from--.

Signed and sealed this 10th day of August 1971.

(SEAL)
Attest:

EDWARD M. FLETCHER, JR.          WILLIAM E. SCHUYLER, JR.
Attesting Officer                Commissioner of Patents